UNITED STATES PATENT OFFICE 2,160,175

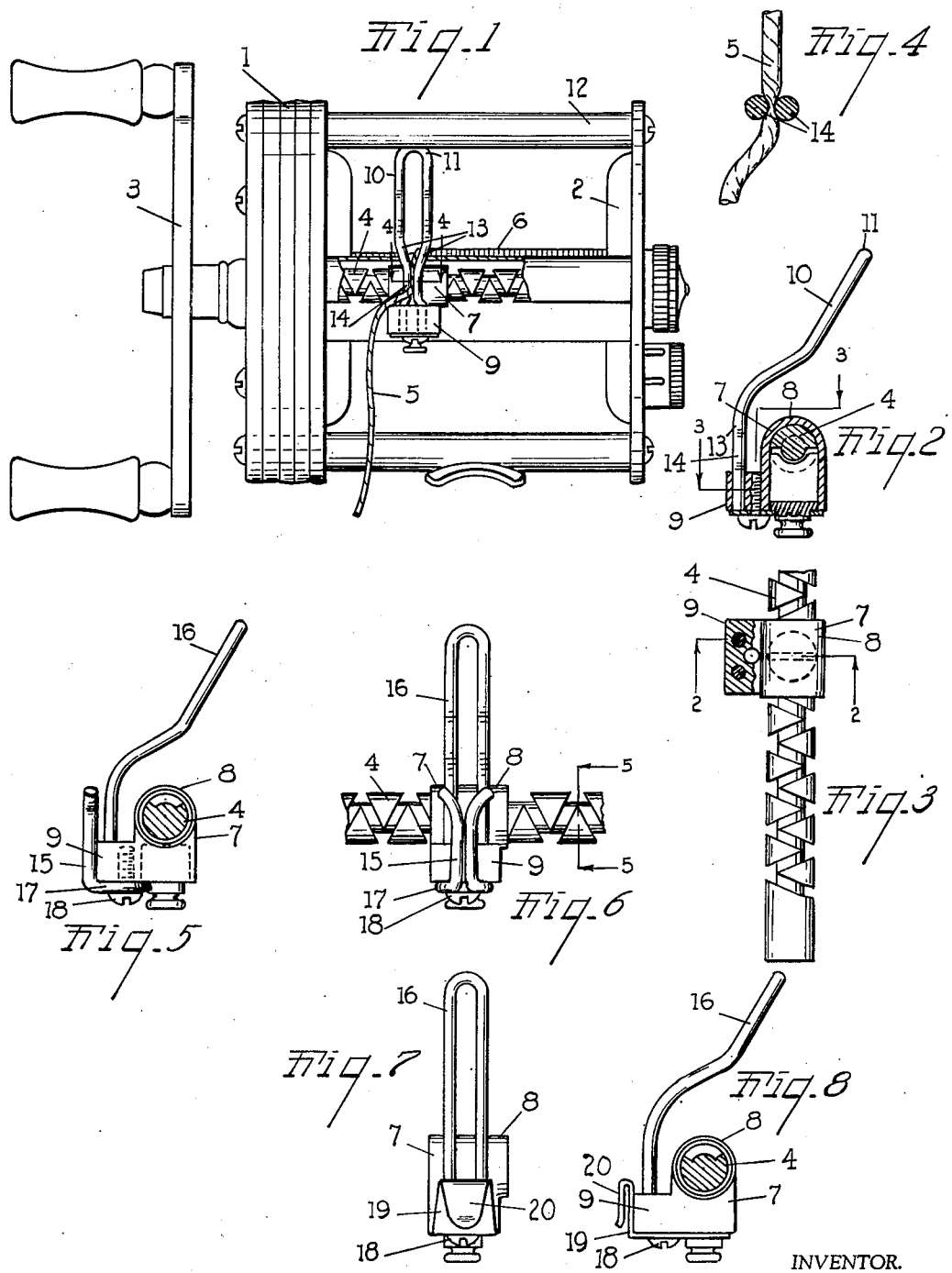

LEVEL WIND FISHING REEL

William Shakespeare, Jr., Kalamazoo, Mich., assignor to Shakespeare Company, Kalamazoo, Mich.

Application August 23, 1937, Serial No. 160,392

8 Claims. (Cl. 242—84.4)

This invention relates to improvements in level wind fishing reels.

In the use of level wind fishing reels, particularly when going to or returning from the fishing grounds, moving from place to place, or carrying the equipment for various reasons, much difficulty and annoyance has been experienced owing to the weight of the bait, either natural or artificial, causing the line to unwind when not manually held.

It is the main object of this invention to provide a level wind fishing reel with means whereby the line is effectively held to prevent its paying out or unwinding from the spool.

A further object is to provide a means having this advantage with which the line may be quickly engaged or disengaged and is of a character that is not likely to snag the line in use.

Objects pertaining to details and economies of my invention will definitely appear from the description to follow. The invention is defined in the claims.

A device embodying the features of my invention is clearly illustrated in the accompanying drawing, in which:

Fig. 1 is a front elevation of a fishing reel embodying the features of my invention, a portion of the traversing shaft carriage housing being sectioned and broken away to show structural details, the line being shown in engaged position with its clip or retaining means.

Fig. 2 is a fragmentary vertical section on line 2—2 of Fig. 3.

Fig. 3 is a fragmentary plan view of the traversing shaft and carriage partially in section on line 3—3 of Fig. 2.

Fig. 4 is an enlarged fragmentary section on line 4—4 of Fig. 1 illustrating the manner of engaging the line with its securing means or clip, the parts being conventionally shown and the collapsing of the line being exaggerated.

Fig. 5 is a detail view of a modified form or embodiment of my invention taken on line 5—5 of Fig. 6.

Fig. 6 is a fragmentary front elevation looking from the left of Fig. 5.

Fig. 7 is a fragmentary front elevation of a carriage provided with another modified form or embodiment of the line retaining clip.

Fig. 8 is a sectional view corresponding to that of Fig. 5 of the embodiment shown in Fig. 7.

In the accompanying drawing I indicates the frame of a fishing reel and 2 the spool thereof which is driven and controlled from the crank 3. The traversing shaft 4 is suitably connected to the crank but as driving connections for the crank and shaft are well known in the art I have not illustrated the same herein. 5 designates the line which is laid upon the spool as indicated at 6 by the reciprocation of the carriage 7 which is operatively associated with the reversely threaded traversing shaft 4.

The housing 8 projects over the carriage with a portion 9 of the carriage projecting in front of the housing. The line guide eye 10 is mounted on this projecting portion. This is preferably formed of a piece of wire bent into a loop with its bight portion 11 extending upwardly into sliding engagement with the pillar 12 of the frame. The arms of the loop are converged downwardly at 13 into parallel portions 14 which are so spaced as to provide a spring clip between which the line may be engaged by a downward thrust thereon. This spring clip portion lies below the top of the housing so that in use there is no tendency for the line to engage with this clip, but by a downward pull or push with the fingers of the user the line may be drawn into the clip and is effectively held thereby. The engagement is capable of resisting a very substantial pull so the line is not likely to be accidentally released but may be easily released intentionally by an upward thrust or pull on the line.

This manner of securing the line is a very substantial advantage in fishing as it prevents the line from being accidentally pulled out or unwound from the spool such as is likely to result from the weight of the bait as it dangles from the end of the rod in carrying the rod from place to place, or when the equipment is stored, or in the great variety of handling which fishing equipment receives in use.

In the embodiment of my invention shown in Figs. 5 and 6 the line clip 16 is formed separately of the line guide eye 15, it being formed of wire and having an anchoring eye 17 receiving the screw 18 on the bottom of the carriage and upwardly projecting arms diverging at their ends to receive the line.

In the embodiment shown in Figs. 7 and 8 the clip 19 is formed of sheet metal and is mounted on the carriage with a hook or clip portion 20 facing downwardly and providing a spring clip with which the line may be engaged.

In the light of the disclosure made other embodiments or adaptations of my invention will be apparent to those skilled in the art.

Having thus described my invention what I claim as new and desire to secure by Letters Patent is:

1. In a fishing reel, the combination with a frame and spool journaled therein, of a traversing shaft, a line guide carriage operatively associated with said shaft, a housing for said shaft and carriage, said carriage having a part projecting forwardly of said housing, and a loop-like line guide eye on said carriage, the arms of the loop being converged at the lower end of the loop so that they lie in parallel relation and in close proximity to each other for a substantial distance at the lower end of the eye providing a spring line engaging clip at the base of the eye and integral therewith.

2. A level wind fishing reel comprising a traversing shaft and carriage operatively associated therewith, a housing for said shaft and carriage disposed above said carriage, and a line guide eye on said carriage in the form of a loop of wire disposed with its bight upwardly projecting above the carriage, the arms of the loop being converged downwardly beginning at a point adjacent the plane of the top of the housing into parallel line clip portions with which the line may be engaged by a downward stroke.

3. A level wind fishing reel comprising a traversing shaft, a carriage operatively associated therewith, a housing for said shaft and carriage, and a line guide eye on said carriage projecting above said housing, said carriage being provided with a spring line clip located at the bottom of the eye and below the plane of the top of the housing and with which the line may be manually engaged for holding the line against accidental stripping or unreeling.

4. In a level wind fishing reel comprising a reciprocating carriage provided with a line guide eye, the combination of a spring line engaging clip disposed in front of the eye and carried by the carriage, said clip facing upwardly so that the line may be engaged therewith by a downward movement thereof and released by a reverse upward movement.

5. A level wind fishing reel comprising a reciprocating line laying carriage provided with an upwardly projecting line guide eye, and a spring engaging line clip at the base of the eye with which the line may be manually engaged for holding the line against accidental stripping or unwinding from the reel.

6. A level wind fishing reel comprising a traversing shaft, a line guide carriage operatively associated with said shaft, and a loop-like line guide eye on said carriage, the arms being converged at the lower end of the loop so that they lie in parallel relation and in close proximity to each other for a substantial distance at the lower end of the eye providing a spring line engaging clip at the base of the eye and integral therewith.

7. A level wind fishing reel comprising a traversing shaft, a line guide carriage operatively associated wtih said shaft, and a loop-like line guide eye on said carriage, the arms being converged at the lower end of the loop providing a spring line engaging clip at the base of the eye and integral therewith with which the line may be manually engaged for holding the line against accidental stripping or unwinding from the reel.

8. A level wind fishing reel comprising a reciprocating line laying carriage provided with an upwardly projecting line guide eye, and a spring line engaging means at the base of the eye with which the line may be manually engaged for holding the line against accidental stripping or unwinding from the reel.

WILLIAM SHAKESPEARE, Jr.